United States Patent
Crawford et al.

(10) Patent No.: US 6,542,966 B1
(45) Date of Patent: Apr. 1, 2003

(54) METHOD AND APPARATUS FOR MANAGING TEMPORAL AND NON-TEMPORAL DATA IN A SINGLE CACHE STRUCTURE

(75) Inventors: John Crawford, Santa Clara, CA (US); Gautam Doshi, Sunnyvale, CA (US); Stuart E. Sailer, Campbell, CA (US); John Wai Cheong Fu, Saratoga, CA (US); Gregory S. Mathews, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/118,204

(22) Filed: Jul. 16, 1998

(51) Int. Cl.[7] ............................................... G06F 12/12
(52) U.S. Cl. ...................................................... 711/133
(58) Field of Search ................................ 711/118, 133, 711/134, 136, 159, 160

(56) References Cited

U.S. PATENT DOCUMENTS

| | | | |
|---|---|---|---|
| 4,928,239 A | * 5/1990 | Baum et al. ................. 364/200 |
| 4,980,823 A | * 12/1990 | Liu ............................. 364/200 |
| 5,546,559 A | * 8/1996 | Kyushima et al. .......... 395/460 |
| 5,644,751 A | * 7/1997 | Burnett ....................... 395/440 |
| 5,701,426 A | * 12/1997 | Ryan ........................... 395/403 |
| 5,774,685 A | * 6/1998 | Dubey ......................... 395/381 |
| 5,930,819 A | * 7/1999 | Hetherington et al. ...... 711/131 |
| 5,943,481 A | * 8/1999 | Wakeland ................. 395/200.6 |
| 6,161,167 A | * 12/2000 | Witt ............................ 711/136 |
| 6,202,129 B1 | * 3/2001 | Palanca et al. ............. 711/133 |
| 6,205,520 B1 | * 3/2001 | Palanca et al. ............. 711/138 |
| 6,223,256 B1 | * 4/2001 | Gaither ....................... 711/134 |
| 6,223,258 B1 | * 4/2001 | Palanca et al. ............. 711/138 |

OTHER PUBLICATIONS

Smith, Alan Jay, "Cache Memories", Computing Surveys, vol. 14, No. 3, Sep. 1982, pp. 473–530.

* cited by examiner

Primary Examiner—Kevin L. Ellis
(74) Attorney, Agent, or Firm—Leo V. Novakoski

(57) ABSTRACT

A method is provided for managing temporal and non-temporal data in the same cache structure. The temporal or non-temporal character of data targeted by a cache access is determined, and a cache entry for the data is identified. When the targeted data is temporal, a replacement priority indicator associated with the identified cache entry is updated to reflect the access. When the targeted data is non temporal, the replacement priority indicator associated with the identified cache entry is preserved. The method may also be implemented by employing a first algorithm to update the replacement priority indicator for temporal data and a second, different algorithm to update the replacement priority indicator for non-temporal data.

23 Claims, 7 Drawing Sheets

METHOD AND APPARATUS FOR MANAGING TEMPORAL AND NON-TEMPORAL DATA IN A SINGLE CACHE STRUCTURE

BACKGROUND OF THE INVENTION

1. Technical Field

This invention relates to systems and methods for caching data, and in particular to systems and methods for managing temporal and non-temporal data in a single cache.

2. Background Art

Processor speeds have been increasing faster than those of the memory systems that supply them with data. One widely-used strategy for addressing the discrepancy between processor and memory speeds is to organize the memory system as a hierarchy of storage structures. This hierarchy typically includes a main memory and one or more caches. A small cache, e.g. an L0 cache, is located close to the processor's core pipeline to provide the processor with fast access to selected data from a working data set. Larger caches (L1, L2, . . .) accommodate increasingly larger portions of the working data set but require longer times to access the data. Data requests are satisfied from the lowest level of the memory hierarchy that holds the requested information.

Caches are kept small to increase their access speed, and the sizes of "on-chip" caches, e.g. L0 and L1, are further limited to reduce their impact on the processor die area. As a result, storage space in caches is at a premium, and the data stored in a cache must be intelligently selected to fully realize the benefits of caching. Strategies typically focus on increasing the probability that frequently requested data is available from one of the low level caches.

Caches exploit the notions of spatial and temporal locality to store data that is likely to be requested by a program closer to the processor's pipeline. Spatial locality refers to the tendency of a program to access data within a given region of memory, before moving on to a different region of memory. If data at a given memory address is accessed, the data at an adjacent memory address is also likely to be accessed. Caches exploit spatial locality by storing blocks of data from adjacent memory locations in the same cache entry or cache line.

Temporal locality refers to the probability that a piece of data accessed by a program will be accessed again soon. The time scale against which "soon" is determined is the time the data spends in a cache ("lifetime") before it is evicted to make room for new data. Data that is likely to be accessed repeatedly during its lifetime is characterized as temporal data, while data that is likely to be accessed infrequently during its lifetime is characterized as non-temporal data.

The temporal and spatial character of data may be illustrated by a matrix multiplication, A·B=C, where A, B, and C are given by:

$$\begin{bmatrix} a_{11} & a_{12} & \cdots & a_{1,n} \\ a_{21} & a_{22} & \cdots & a_{2n} \\ \vdots & \vdots & \cdots & \vdots \\ a_{kl} & a_{k2} & \cdots & a_{kn} \end{bmatrix} \begin{bmatrix} b_1 \\ b_2 \\ \vdots \\ b_n \end{bmatrix} = \begin{bmatrix} c_1 \\ c_2 \\ \vdots \\ c_n \end{bmatrix} \quad \text{Eq. (I)}$$

Here, $a_{ij}$ is the element in the $j^{th}$ column of the $i^{th}$ row of matrix A, $b_j$ is the $j^{th}$ element in column vector B, and $c_i$ is the $i^{th}$ element in resulting column vector C. Each element of C is related to the elements of A and B as follows:

$$\sum_{j=1}^{n} (a_{ij} b_j) = c_i, \quad \text{Eq. (II)}$$

where n is the number of columns in A.

To evaluate an element $c_i$, the processor accesses sequentially the elements of row i of A ($a_{i1} \ldots a_{in}$) and multiplies each by a corresponding element of B ($b_1 \ldots b_n$). The row elements of A are thus spatially local, and where space permits, they are stored in the same cache line. However, the row elements of A are not temporally local, since they are only accessed once to evaluate Eq. (I).

The elements of B are also spatially local since they are accessed sequentially as the processor steps through the corresponding row elements of A, per Eq. (II). Consequently, they are stored in the same cache line, space permitting. The temporal character of B's elements depends in part on the cache size. Where the cache is large enough to accommodate the elements of A and B, the elements of B are temporally local as well, since they are accessed for each row of matrix A. For larger matrices and vectors in smaller caches, some of the vector elements may have to be evicted to accommodate the matrix elements. However, this can often be avoided through various blocking techniques.

It is clearly desirable to allocate cache space to temporal data, e.g. vector B, since it is accessed repeatedly. On the other hand, a certain amount of cache space should be allocated to non-temporal data, e.g. matrix A, to avoid long latency memory accesses when the data is required. Such data may be cached in anticipation of its use through prefetching and advanced load operations. However, where these operations evict temporal data to accommodate non-temporal data, they can reduce the performance of the cache.

Employing separate storage structures for temporal and non-temporal data prevents non-temporal data from displacing temporal data in a cache. However, use of a separate storage structure has several significant drawbacks. The storage structure requires additional die area, which is a limited resource in modem processors, and limiting the size of the cache structure reduces the lifetime of the data it stores. This reduction is particularly significant for non-temporal data, which is accessed infrequently as it is. In addition, coherence must be maintained between the second storage structure and the other storage structures of the memory system. The necessary circuitry consumes additional die area, complicates the design of the cache system, and is likely to degrade the cache access time.

SUMMARY OF THE INVENTION

The present invention is a system and method for managing temporal and non-temporal data in the same cache structure. Non-temporal data is allocated space in the cache structure using a replacement scheme that is biased to favor retention of temporal data.

In accordance with the present invention, the temporal/non-temporal character of data targeted by a cache access is determined, and a cache entry for the data is identified. A replacement priority indicator associated with the identified cache entry is updated according to the temporal/non-temporal character of the data.

For one embodiment of the invention, the replacement priority indicator is updated to reflect the cache access when the targeted data is temporal, and it is preserved in its current state when the targeted data is non-temporal. For example, the replacement priority indictor may identify a least-recently-used (LRU) cache entry from among candidate cache entries. On a cache miss that specifies non-temporal data, the LRU designation is preserved. On a cache miss that specifies temporal data, the LRU designation is modified to a most recently used (MRU) designation.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The advantages of the present invention may be better appreciated with reference to conventional cache management systems. These systems are described, for example, in A. J. Smith, "Cache Memories," ACM Computing Surv. 14, No. 3, 473–530 (September 1982). Cache management systems attempt to identify data for storage in the cache hierarchy through various priority-based replacement policies. These policies include least-recently-used (LRU), pseudo LRU, least-frequently-used (LFU), not-recently-used (NRU), and other replacement policies. In their conventional forms, these policies identify stale/fresh data in a cache by tracking accesses to the cache entries and updating associated replacement priority indictors (RPIs) to reflect the timing of these accesses, e.g. how recently or how often data in the associated entry was accessed. When space must be allocated for new data, the RPI identifies a cache entry to be replaced.

Figure 1:
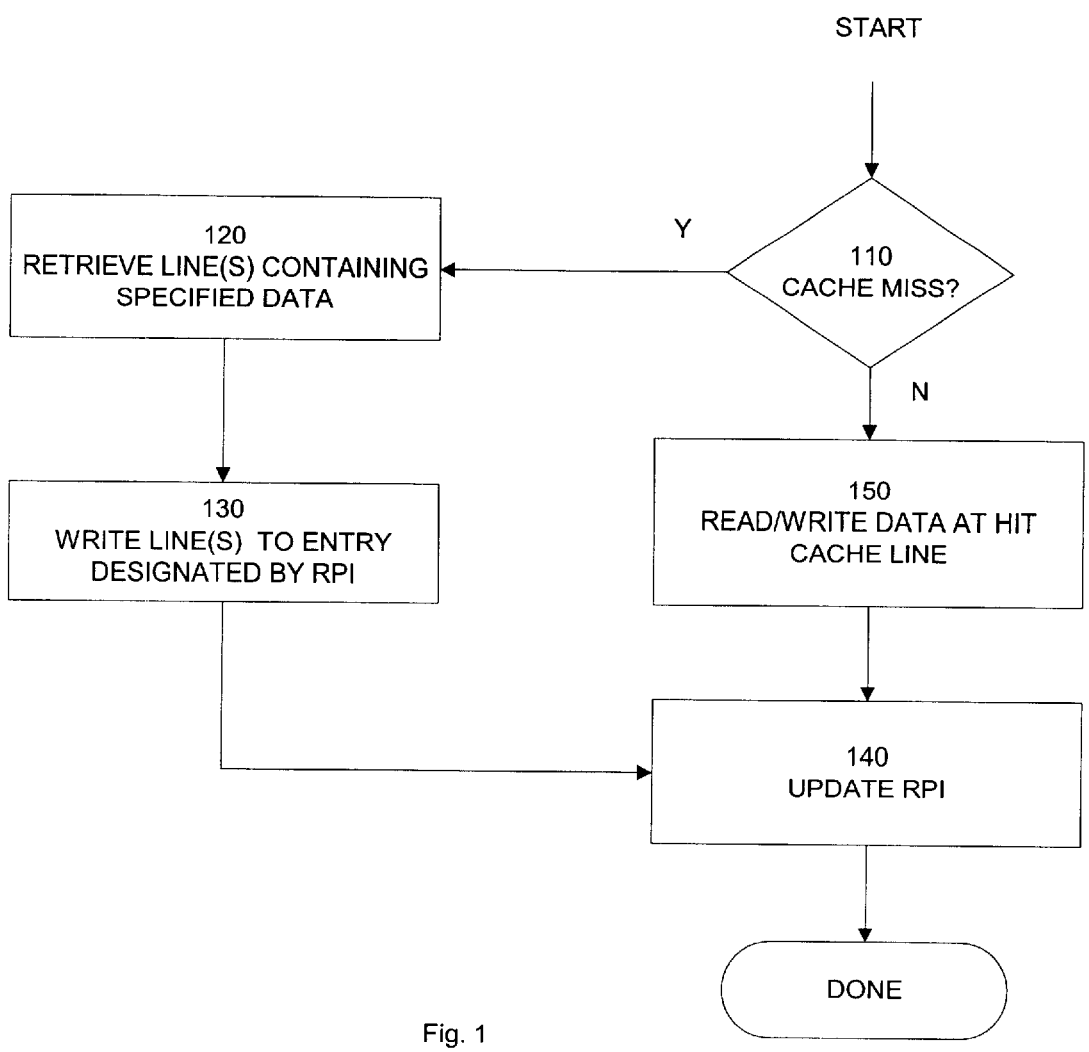
FIG. 1 is a flow chart showing conventional methods for managing data in a cache.

FIG. 1 is a flow chart showing a conventional method 100 for allocating space in a cache using an LRU replacement policy. Method 100 is initiated when a cache access is detected 110. On a cache miss, a line of cache data is retrieved 120 from elsewhere in the memory system and written 130 to one of a number of candidate cache entries according to an RPI associated with the candidate entries. In an n-way set associative cache, the candidate entries are the n-entries of a set indicated by the address of the target data. When the cache miss is triggered by a load operation, the target data is included in the cache line provided by the memory hierarchy. When the cache miss is triggered by a store operation, target data specified in the store instruction is combined with the cache line provided by the memory hierarchy. In each case, the cache entry designated as LRU is allocated for the new data. The RPI is then updated 140 to reflect the status of the candidate cache entries following the write operation. In particular, the RPI is modified so that the entry that received the target data (formerly designated LRU) is now designated most recently used (MRU). The entries designated LRU-1, LRU-2, etc. are updated to LRU, LRU-1, etc. respectively.

If a cache hit is detected 110, the cache access is implemented 150 and the RPI associated with the hit entry is updated to reflect the status of the candidate entries following the access. For example, the hit entry is designated MRU and the entries designated LRU-1, LRU-2 . . . are updated to LRU, LRU-1 . . . , respectively. In each case (cache hit, cache miss) the updated indicator reflects the fact that the cache entry touched by the access is now MRU, by virtue of the access.

Conventional replacement method 100 does not distinguish between temporal and non-temporal data. For example, if a cache access that targets non-temporal data misses, and the cache entry designated as LRU contains temporal data, method 100 evicts the temporal data in favor of the non-temporal data. This happens even though the temporal data has a greater likelihood of being used again than the non-temporal data displacing it. Providing a separate cache structure for non-temporal data eliminates this phenomenon, but it has the drawbacks discussed above.

The present invention accommodates temporal and non-temporal data in the same cache structure without impeding the performance of the cache. This is accomplished by allocating cache entries to non-temporal data in a manner that favors retention of temporal data in the cache. Non-temporal data is thus accommodated by evicting preferentially other non-temporal data or the "least temporal" temporal data. This eliminates the need for a separate storage structure for non-temporal data and the attendant shortcomings of that approach. It also ensures that performance advantages gained by, e.g., prefetching and advanced load operations, (fewer long latency accesses) are not offset by reduced cache performance (decreased cache hit rate).

Figure 2:
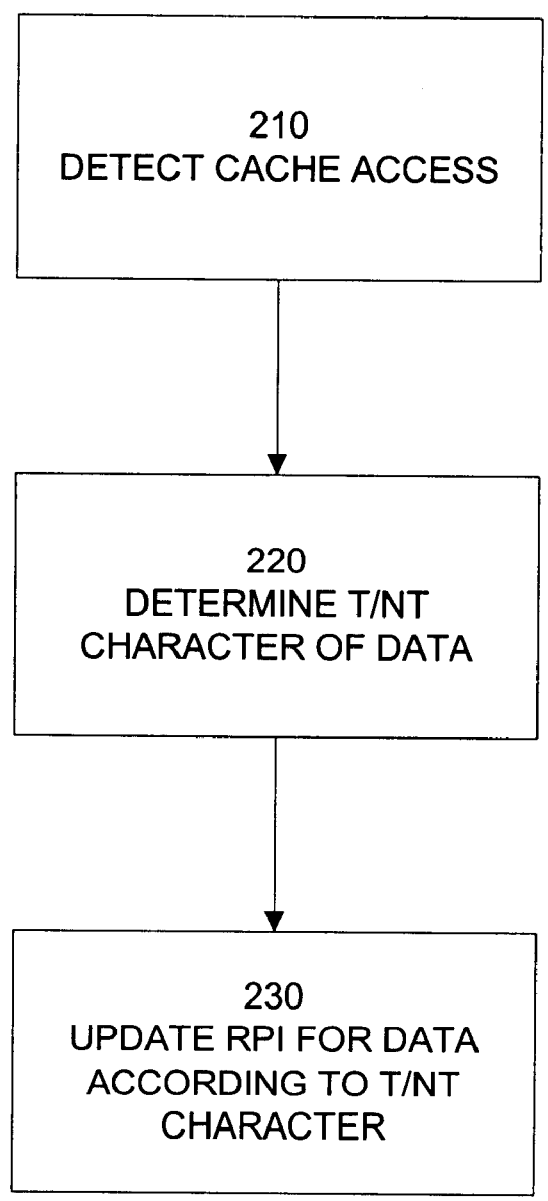
FIG. 2 is flow charts representing an overview of a method in accordance with the present invention for managing temporal and non-temporal data in the same cache.

FIG. 2 is a flow chart showing an overview of a method 200 in accordance with the present invention for managing data in a cache that implements a priority-based replacement policy. Each cache entry is associated with an RPI that reflects the relative suitability of data allocated to the entry for replacement. Method 200 is initiated when a cache access, e.g. load, store operation, is detected 210. Data targeted by the cache access is specified by an address that can be associated with a cache entry using well known techniques. Method 200 determines 220 the temporal or non-temporal character of the targeted data, using various methods that are discussed in greater detail below. The RPI associated with the accessed cache entry is then updated 230 according to the temporal/non-temporal character of the targeted data. For one embodiment, the RPI is adjusted to reflect the cache access when temporal data is specified, and the RPI is preserved in its current state when non-temporal data is specified. For another embodiment, a first RPI update algorithm is applied when temporal data is specified and a second RPI update algorithm is applied when non-temporal data is specified.

For one embodiment of the present invention, the cache employs an LRU replacement policy, where the RPI represents the order in which an associated set of cache entries have been accessed. In an n-way, set associative cache, for example, an RPI is associated with each set and reflects the order in which the n-cache entries of the set (or a subset of these entries) have been accessed. An encoded RPI may represent the access order from LRU to MRU. In this embodiment, the RPI is updated for cache accesses that target temporal data and the update is by-passed or modified for cache accesses that target non-temporal data. This increases the probability that an entry storing non-temporal data is designated as stale (LRU) by the RPI. Such entries are preferentially evicted on cache misses to accommodate new data.

In the following discussion, the present invention is illustrated for an embodiment in which an RPI update is bypassed for non-temporal data. Persons skilled in the art and having the benefit of this disclosure will recognize modifications necessary to implement different RPI update procedures for temporal and non-temporal data.

Figure 3:
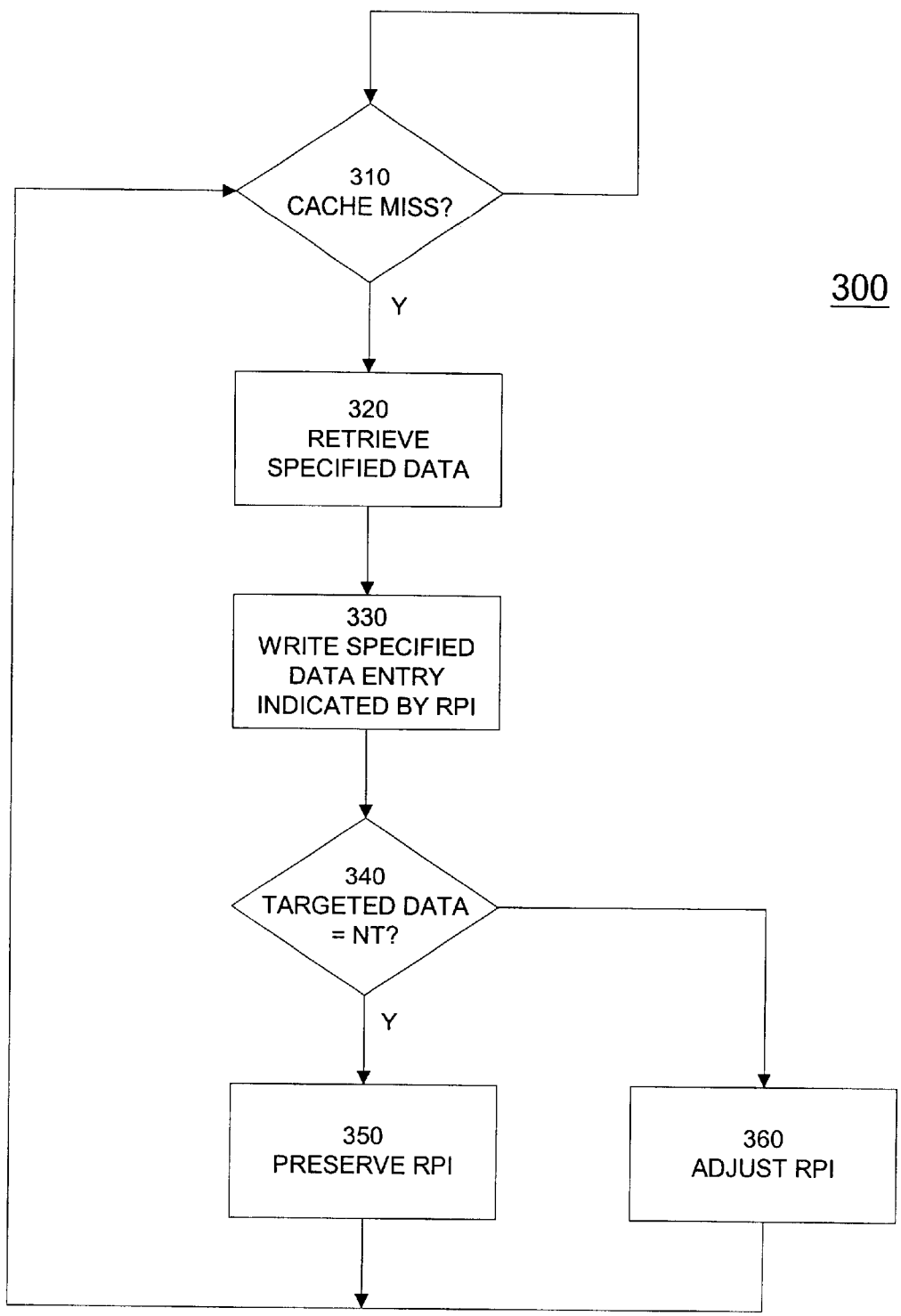
FIG. 3 is a flow chart representing a method in accordance with the present invention for managing cache misses.

FIG. 3 is a flow chart representing a method 300 for managing entries on a cache miss in accordance with the present invention. In the disclosed embodiment, method 300 is initiated when a cache access misses 310, triggering a cache line fill. The data targeted by the access is retrieved 320 and written 330 to one of a number of candidate cache entries according to a replacement priority indicator (RPI) associated with the entries. For cache misses triggered by store instructions, target data specified in the store is combined with the retrieved cache line before writing it to the cache. If the targeted data is determined 340 to be temporal (T), the RPI is updated 360 to reflect the cache access. If the targeted data is determined 340 to be non-temporal (NT), the current RPI is maintained 350.

In FIG. 3, the order shown for steps 320, 330, and 340 in FIG. 3 is not intended to indicate their chronology. The temporal or non-temporal character of the data may be determined (step 340) any time after the cache access is detected and before the RPI is updated. The same is true for steps 420 and 430 of FIG. 4 (below).

Figure 4:
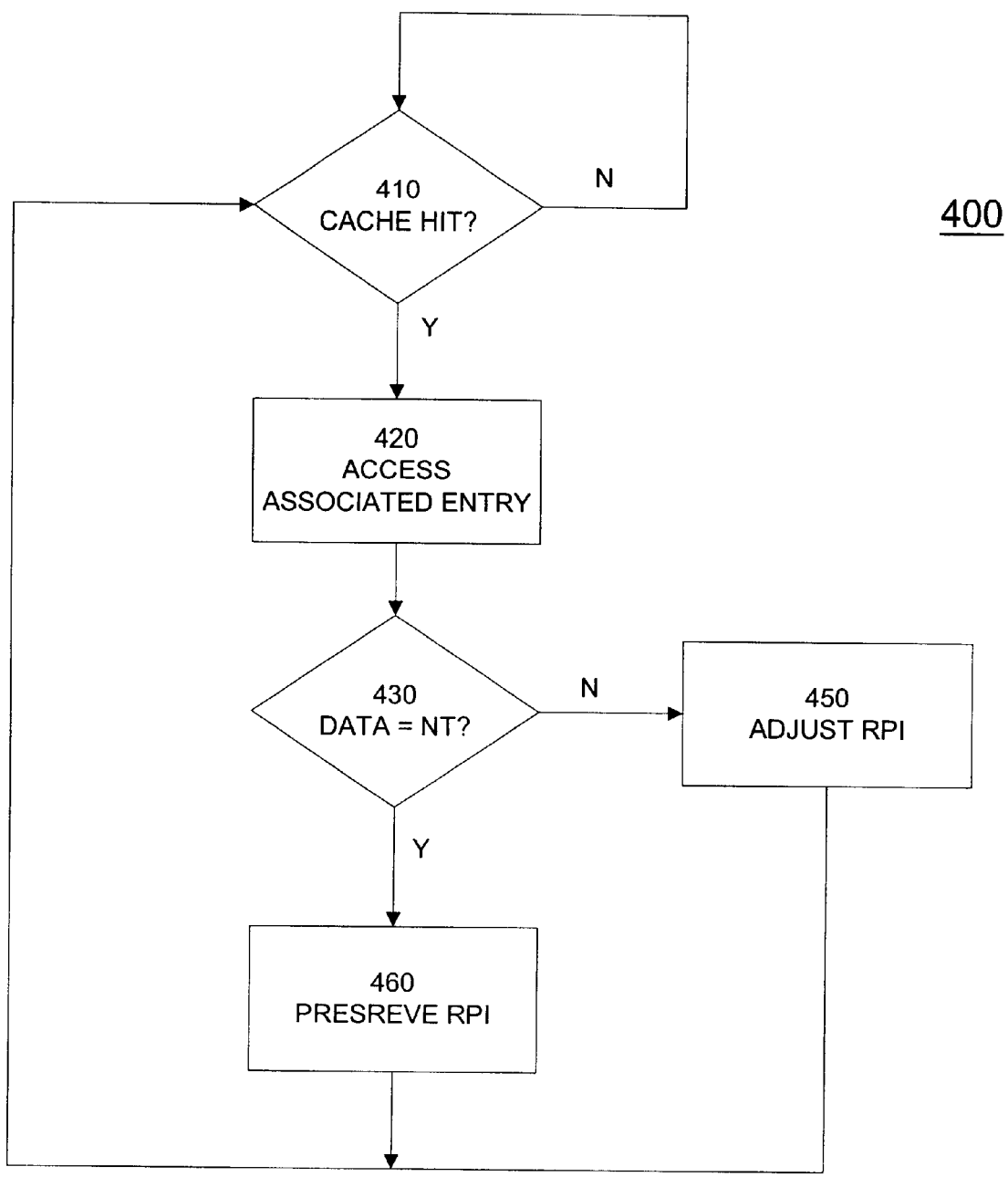
FIG. 4 is a flow chart representing a method in accordance with the present invention of managing cache hits.

FIG. 4 is a flowchart of a method 400 in accordance with the present invention that is suitable for use when a cache access hits in the cache ("cache hit"). When a cache hit is detected 410, the cache entry associated with the targeted data is accessed 420. During access 420, the targeted data is written to or read from the hit entry, according to whether the access is triggered by a load or store, respectively. If the targeted data is determined 430 to be temporal, the RPI is updated 450 to reflect the access. If the targeted data is determined 430 to be non-temporal, the RPI is maintained in its current state.

The temporal or non-temporal character of data may be determined in a number of ways. For one embodiment of the invention, load and store instructions (and their equivalents) have an associated field in which the temporal/non-temporal character of the target data may be indicated. The indicated temporal/non-temporal character may be determined by the programmer through data declarations, pragmas or instruction selection or by the compiler through path profiling and various other well known methods. The temporal/non-temporal character may also be indicated by the areas of memory in which the data is stored. This may be accomplished using, for example, page table attributes, address groups, and the like. For another embodiment, the processor may determine the temporal or non-temporal character of data by monitoring the flow of data through its hardware. In this case, the temporal or non-temporal character of data targeted by a cache access is provided by the usage history of the data in the processor.

Figure 5:
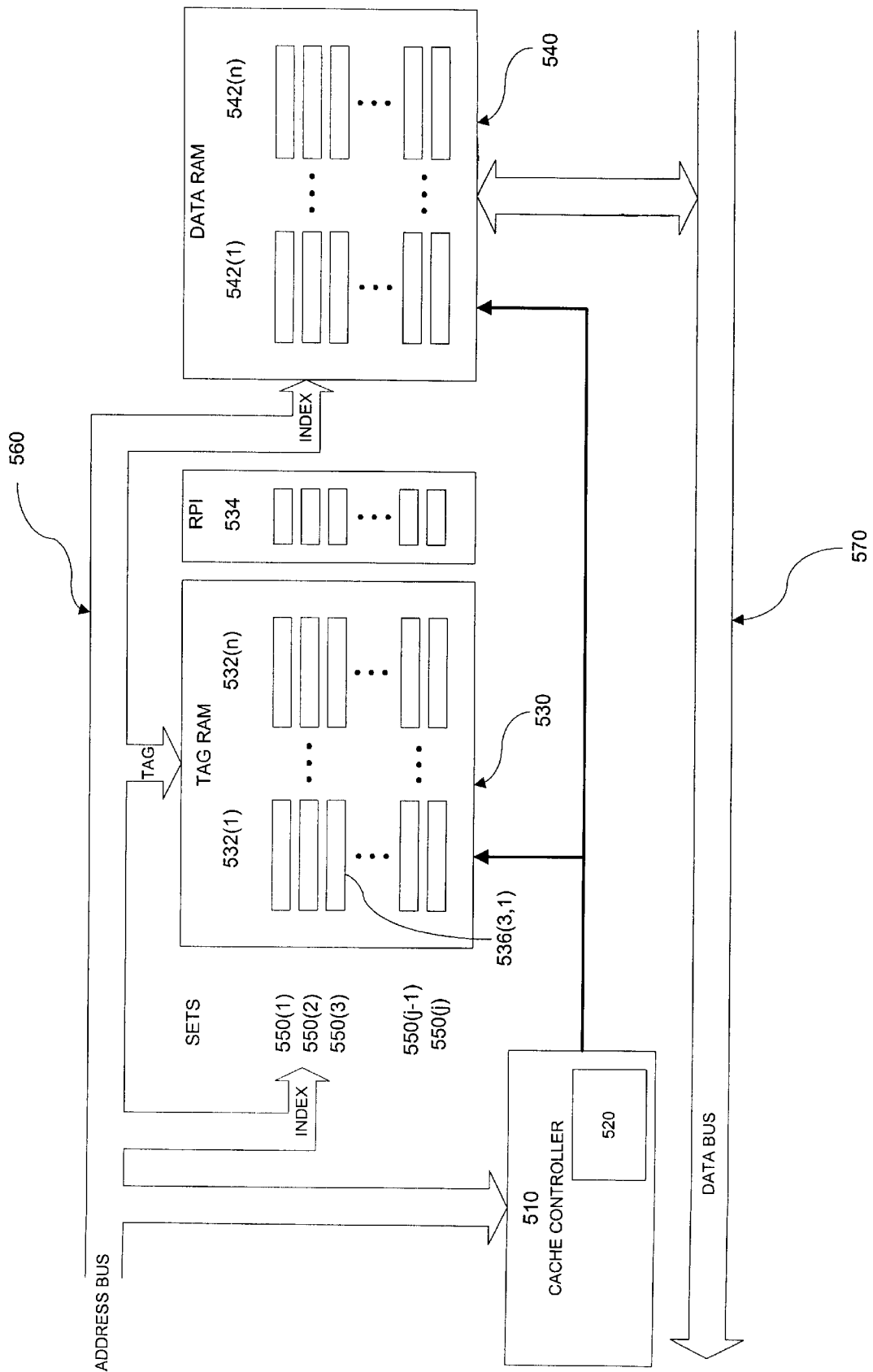
FIG. 5 is a block diagram of a cache system that includes a replacement module for implementing the methods of FIGS. 3 and 4.

FIG. 5 is a block diagram of one embodiment of a cache system 500 that is suitable for implementing the present invention. Cache 500 includes a cache controller 510, a tag RAM 530, priority registers 534, a data RAM 540, a first bus 560, and a second bus 570. Cache controller 510 includes a replacement module 520 that implements a cache line replacement policy in accordance with the present invention.

In the disclosed embodiment, cache 500 is a set associative cache comprising j-sets of n-ways each. In particular, tag RAM 530 includes tag data arranged in n-ways 532(1)–532(n) of j-sets 550(1)–550(j), and data RAM 540 includes copies of cached data arranged in n-ways 542(1)–542(n) of j-sets 550(1)–550(j) with addresses corresponding to those of tag RAM 540. Each set 550 of cache 500 has a priority register 534 in which an RPI for the associated set 550 is stored. Examples of retention priority indicators are the LRU, pseudo LRU, and LFU designations mentioned above. Priority registers 534 are shown as a separate elements, but they may be incorporated in tag RAM 530, data RAM 540, or cache controller 510.

A data entry or cache line in cache 500 may be identified by the set and way in which it is stored. For example, the data in set 550(j-1) at way 542(1) corresponds to a line of cache data that may be accessed and manipulated independently of, for example, the line of cache data in set 550(3) at way 542(n). A cache access is initiated by providing the tag and index portions of a s specified address to tag and data RAMs 530, 540. The index specifies a set 550 of cache 500, which includes n different cache lines corresponding to n-ways 542(1)–542(n). Tag values stored in these n-ways of tag RAM 530 are compared against the tag value provided on first bus 560 to determine whether one of the cache lines corresponds to the specified entry. The operation of set associative caches is well known in the art and is not described in greater detail here.

The replacement policy represented in FIGS. 3 and 4 allows temporal and non-temporal data to reside in cache 500 while minimizing the likelihood that the temporal data will be evicted from the cache by non-temporal data. This replacement policy is implemented by replacement module 520 in conjunction with priority registers 534. In particular, when a line of cache data is written to cache 500 following a cache miss, a set 550 and an associated priority register 534 are identified from the index bits of the data's address. An RPI in priority register 534 indicates which way 532 of the set should be replaced. Replacement module 520 updates the RPI if temporal data is being written, and preserves the current state of the RPI if non-temporal data is being written. Similarly, when a cache access hits one of the cache entries, e.g. 536(3,1), replacement module 520 updates or preserves the RPI in a corresponding priority register (534(3)), according to whether the data targeted by the access is temporal on non-temporal, respectively.

Figure 6A:
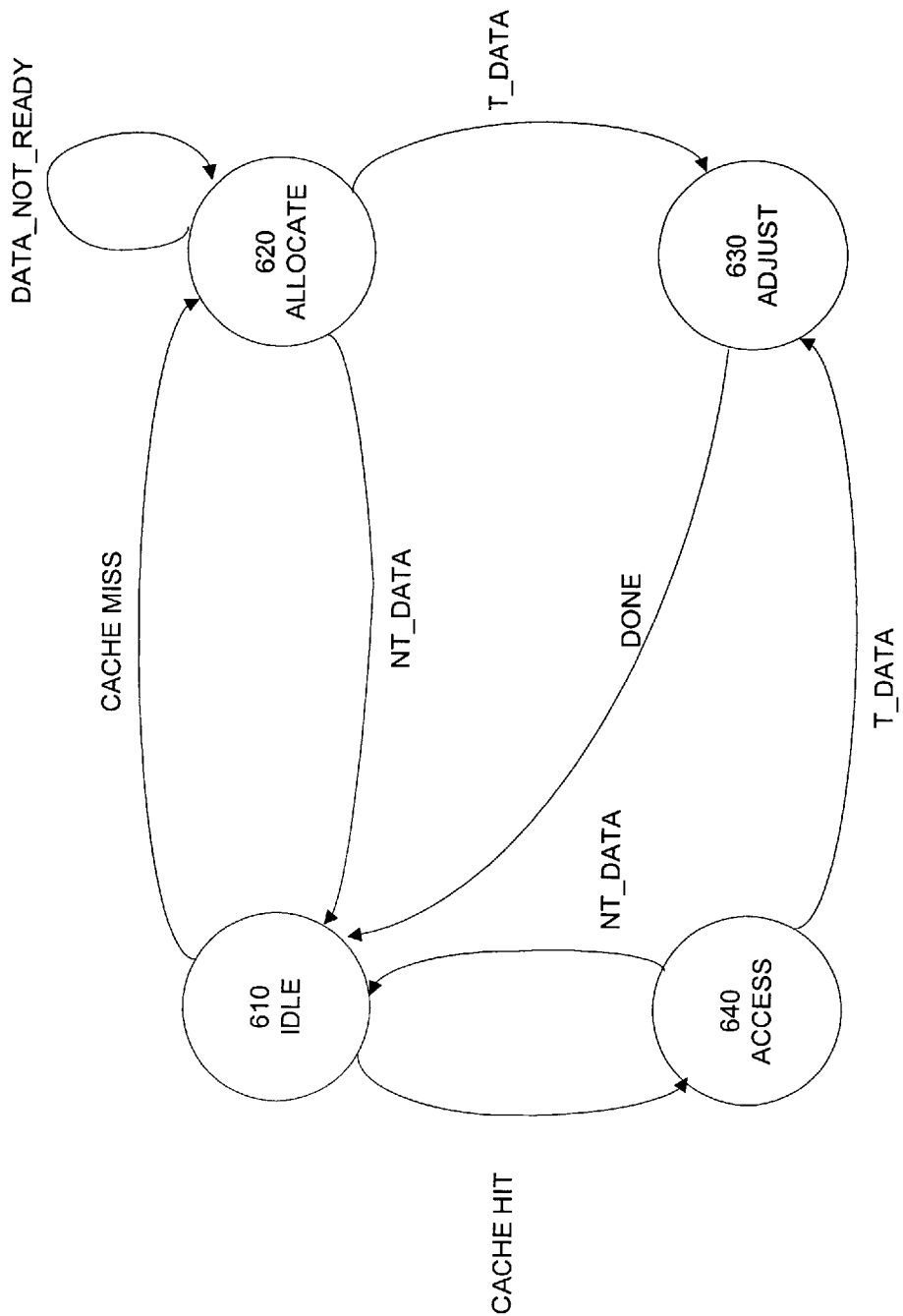
FIGS. 6A and 6B are embodiments of state machines that may be implemented by the replacement module of FIG. 5.

FIG. 6A represents one embodiment of a state machine 600 implemented by replacement module 520 in accordance with the present invention. State machine 600 remains in an IDLE state 610 until an access to cache 500 is detected. When a cache access misses, state machine 600 transitions to an ALLOCATE state 620. In ALLOCATE state 620, state machine 600 S determines which of a plurality of candidate cache entries is to receive the cache line that includes the targeted data, and writes the cache line to the appropriate entry. In the embodiment described above, the allocated cache entry is determined by reference to a priority register 534 associated with the candidate entries, according to the replacement policy that is implemented. For example, an LRU replacement policy would select the entry designated LRU for replacement and would allocate this entry to the new line of data.

As noted above, a cache miss triggers a cache fill, which retrieves a cache line corresponding to the missed address from the memory hierarchy. When the cache miss is triggered by a store instruction, the line of cache data is updated with target data indicated by the store instruction before it is written to the cache entry. When the cache miss is triggered by a load instruction, the retrieved line of cache data includes the targeted data.

State machine 600 transitions out of ALLOCATE state 620 when it receives an indication of the T/NT character of the target data. When T data is indicated, state machine 600 transitions from ALLOCATE state 620 to ADJUST state 630. In ADJUST state 630, the RPI in the priority register associated with the candidate entries is adjusted to reflect the recent access, e.g. the accessed way is changed from LRU to MRU and the remaining ways are adjusted accordingly. When this operation is completed (DONE) state machine 600 transitions back to IDLE state 610. It is noted that "victim" replacement, new line allocation, and RPI update may be synchronized in various sequences, depending on the implementation details of the cache.

If in ALLOCATE state 620, the targeted data is identified as NT, state machine 600 transitions from ALLOCATE state 620 back to IDLE state 610. ADJUST state 630 is by-passed, preserving the current RPI in priority register 534.

When a cache hit is detected in IDLE state 610, state machine 600 transitions to an ACCESS state 640. In ACCESS state 640, the cache entry to be accessed is identified through the targeted data's address, and the target data is either read from or written to the entry according to whether the access was triggered by a load or store, respectively. State machine 600 transitions to IDLE state 610 or ADJUST state 630 according to the T/NT character of the targeted data. When T data is indicated, state machine 600 transitions to ADJUST state 630, and the RPI in the priority register 534 associated with the hit entry is updated to reflect the access, e.g. the accessed way is changed from LRU to MRU and the remaining ways are adjusted accordingly.

If in ACCESS state 640, the targeted data is identified as NT, state machine 600 transitions from ACCESS state 640 back to IDLE state 610. ADJUST state 630 is by-passed, preserving the current RPI in priority register 534.

Figure 6B:
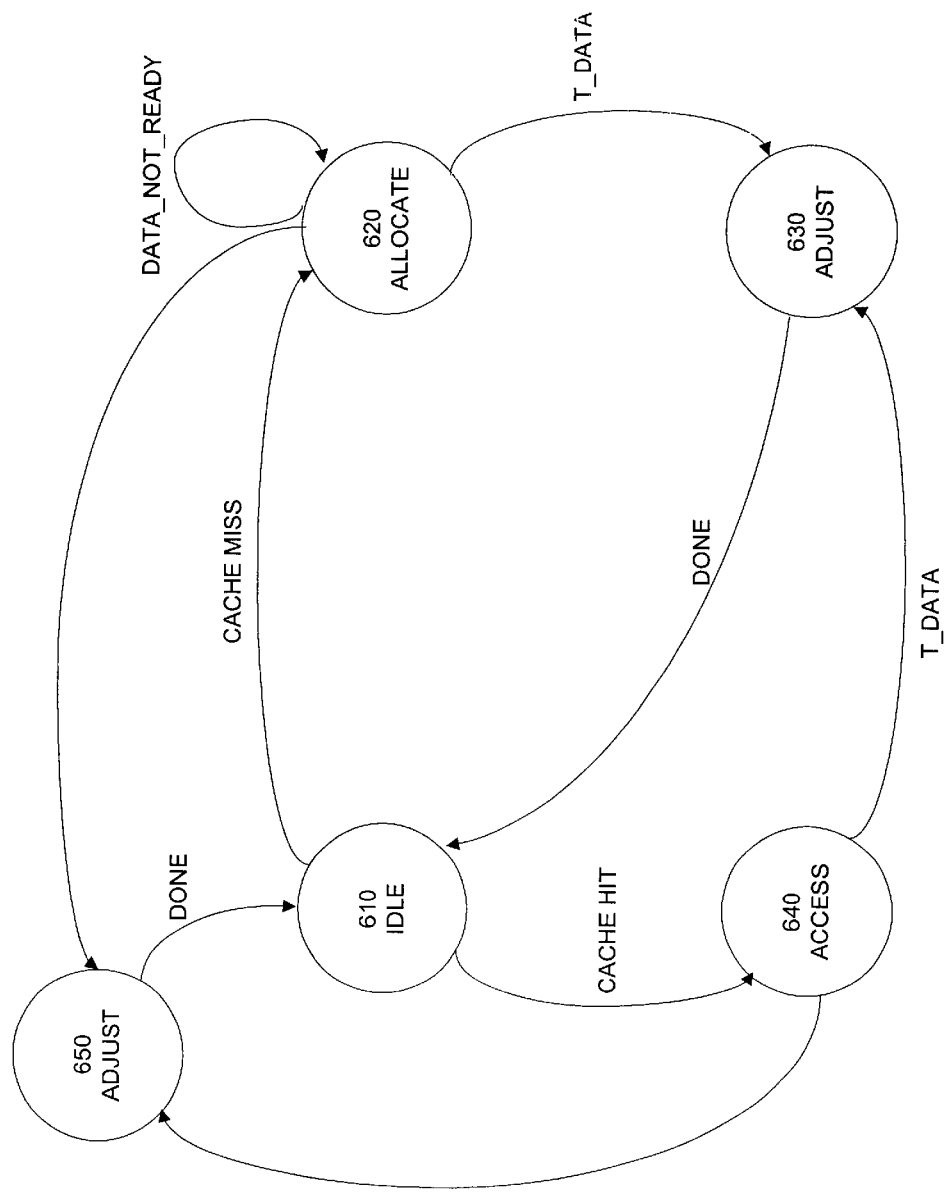

FIG. 6B represents another embodiment of state machine 600 that may be implemented by replacement module 520. State machine 600' is suitable where different RPI update algorithms are implemented for temporal and non-temporal data. In the disclosed embodiment, an additional ADJUST state 650 is provided to implement the RPI update algorithm for non-temporal data. For example, ADJUST state 650 may adjust the RPI to designate the accessed data as, e.g., LRU-P rather than preserving its LRU designation. Here, $1 \leq P < n$ for an n-way, set associative cache. This algorithm still biases non-temporal data for replacement, but the bias is not as strong as that provided by the state machine of FIG. 6A.

While the present invention has been illustrated using a modified (LRU) replacement policy, the invention may be applied to other priority-based replacement policies, including pseudo LRU, least-frequently-used (LFU), not-recently-used (NRU) and equivalent policies. Each policy has an associated RPI, updates of which may be biased in the manner described above to accommodate non-temporal data in the cache while preferentially retaining temporal data.

The present invention has so far been described for the case where the data to be allocated to the cache represents operands for instructions implemented by the processor. The invention also applies where the data represents instructions. Instructions may be characterized as having temporal or non-temporal locality, and this information may be used to manage instruction caching in accordance with the present invention. For example, in the absence of branches, instructions are executed sequentially and, consequently, exhibit non-temporal (and spatial) locality. Branch instructions in a code sequence may cause sections of code sequence to be skipped, eliminating their spatial locality. In addition, branch instructions such as loops may cause sequences of instruction to be accessed repeatedly, giving them temporal locality. The present invention may be adapted to use the temporal/non-temporal character of instructions to allocate space in an instruction cache (or a unified cache) in the manner described above.

One method for determining the temporal/non-temporal character of data is to monitor the usage patterns of the data. The temporal/non-temporal character of instructions may be determined in a similar manner. For example, processors typically include branch prediction logic that can track whether a branch was taken or not taken on previous encounters. Such "branch history" information for a frequently taken loop branch can be used to indicate that the sequence of instructions repeated in the loop have temporal locality. Similarly, some processor architectures may support branch hints to convey branching information developed by the compiler (static branch information) to the processor hardware. Branch hint instructions indicate to the processor hardware, based on compile time information, whether the branch is likely to be taken and the target address of the branch if it is taken. Branch hints thus provide information suitable for characterizing instructions as temporal or non-temporal.

Once the temporal/non-temporal character of instructions is available, the present invention may be used to allocate cache space to instructions in the manner described above for operand data.

There has thus been described a system for managing temporal and non-temporal data in the same cache by biasing cache management module to favor replacement of non-temporal data (instructions). Data (including instructions) is characterized according to its temporal/non-temporal character. When temporal data is accessed, a retention priority indicator associated with the accessed entry is updated to reflect the access. When non-temporal data is accessed, a retention priority indicator associated with the accessed entry is preserved

What is claimed is:

1. A method for managing data in a cache, the method comprising:
   detecting an access that hits a cache entry;
   determining a temporal/non-temporal character of data targeted by the access; and
   preserving or adjusting a current value of a replacement priority indicator associated with the cache entry if the targeted data is non-temporal or temporal, respectively.

2. The method of claim 1, further comprising:
   detecting a miss responsive to a cache access;
   identifying a replacement priority register associated with the cache access;
   determining a temporal/non-temporal character of data targeted by the access; and
   selecting a cache entry for replacement according to a replacement priority indicator associated with provided by the priority register.

3. The method of claim 1, wherein preserving a current value of the replacement priority indicator if the targeted data is non-temporal comprises bypassing an update to the replacement priority indictor that reflects the cache access.

4. The method of claim 3, wherein adjusting a current value of the replacement priority indicator comprises adjusting the replacement priority indicator to reflect the access when the targeted data is temporal.

5. The method of claim 1, wherein adjusting the replacement priority indicator if the targeted data is temporal comprises indicating the cache entry as a most recently accessed cache entry.

6. A method for updating a cache on a cache access hit comprising:
   determining whether data targeted by the cache access is temporal or non-temporal;
   retrieving the targeted data from a cache entry hit by the cache access; and
   adjusting a replacement priority indicator associated with the hit cache entry to reflect the cache access if the targeted data is temporal and reserving the replacement priority indicator if the targeted data is non-temporal.

7. The method of claim 6, wherein the cache hit is generated in response to a load or store instruction that specifies the targeted data and determining whether the data is temporal comprises reading a field in the load or store instruction that identifies the targeted data as temporal or non-temporal.

8. A method for managing data in a cache, the method comprising:
   detecting a hit to a cache entry responsive to a cache access
   determining whether data targeted by the cache access is temporal or non-temporal;
   updating a replacement priority indicator associated with the hit cache entry to reflect the cache access if the targeted data is temporal; and
   preserving the replacement priority indicator associated with the hit cache entry if the targeted data is non-temporal.

9. The method of claim 8, wherein detecting a hit to a cache entry comprises:
   detecting a plurality of candidate cache entries that can be associated with a first portion of an address for the targeted data;
   selecting one of the candidate cache by reference to a second portion of the address.

10. The method of claim 9, wherein preserving the replacement priority indicator comprises retaining a replacement priority for the candidate cache entries indicated by the replacement priority indicator.

11. A cache for storing temporal and non-temporal data comprising:
   a plurality of cache entries, each entry capable of storing data;
   a priority register associated with the plurality of cache entries, the priority register to store a value indicating replacement information for the plurality of cache entries; and
   a replacement module to adjust or preserve the priority register value, responsive to a cache access that hits one of the plurality of cache entries, according to whether the cache access involves temporal or non-temporal data, respectively.

12. The cache of claim 11, wherein the cache is an n-way set associative cache and each entry of the plurality of cache entries corresponds to one of the n-ways of a set of the cache.

13. The cache of claim 11, wherein the replacement module implements a priority based replacement policy in which the priority register value indicates a replacement priority for the plurality of cache entries.

14. The cache of claim 13, wherein the priority-based replacement policy updates the priority register value for cache accesses involving temporal data and by-passes the update for cache accesses involving non-temporal data.

15. A processor comprising:
   an execution pipeline; and
   a cache coupled to the execution pipeline, the cache including:
      a plurality of cache entries, each entry capable of storing data;
      a priority register associated with the plurality of cache entries to indicate a replacement priority for the plurality of cache entries; and
      a replacement module to adjust or maintain the replacement priority according to a temporal or non-temporal character, respectively, of data targeted by a load or store instruction in the execution pipeline that hits one of the plurality of cache entries.

16. The processor of claim 15, wherein the replacement module adjusts the replacement priority if the target data is temporal and preserves the replacement priority if the target data is non-temporal.

17. The processor of claim 10, wherein the update implemented by the replacement module is biased to favor retention of temporal data in the cache.

18. A processor comprising:
   an execution pipeline;
   a cache including a plurality of entries and a replacement priority indicator associated with the plurality of entries, to transfer target data to and from the execution pipeline in response to a cache access; and
   replacement means to detect a cache hit to one of the plurality of entries and to bypass an update of the associated replacement priority indicator if the target data is non-temporal.

19. The processor of claim 18 wherein the replacement means adjusts the current value of the replacement priority indicator to reflect the cache hit if the target data is temporal.

20. The processor of claim 19, wherein the replacement means includes logic to detect the temporal/non-temporal character of the target data and a state machine to update the replacement priority indicator according to the temporal/non-temporal character of the target data.

21. The processor of claim 20, wherein the detect logic receives an indication of temporal/non-temporal character from an instruction field, a page table, or a memory address associated with the cache access.

22. The processor of claim 18, wherein the target data is an instruction or an instruction operand.

23. A method for updating a cache comprising:
   monitoring data usage in a code sequence;
   determining from the monitored data usage if data targeted by a cache access is temporal or non-temporal;
   retrieving the targeted data from a cache entry hit by the cache access; and
   updating a replacement priority indicator associated with the hit cache entry according to the temporal or non-temporal character of the targeted data.

* * * * *

UNITED STATES PATENT AND TRADEMARK OFFICE
CERTIFICATE OF CORRECTION

PATENT NO.    : 6,542,966 B1
DATED         : April 1, 2003
INVENTOR(S)   : Crawford et al.

It is certified that error appears in the above-identified patent and that said Letters Patent is hereby corrected as shown below:

<u>Column 2,</u>
Line 42, delete "modem", insert -- modern --.

<u>Column 6,</u>
Line 63, after "600", delete "S".

Signed and Sealed this

Ninth Day of September, 2003

JAMES E. ROGAN
*Director of the United States Patent and Trademark Office*